US008831592B2

(12) United States Patent
Elliot et al.

(10) Patent No.: US 8,831,592 B2
(45) Date of Patent: Sep. 9, 2014

(54) MONITORING SYSTEM FOR DISTRIBUTED ANTENNA SYSTEMS

(71) Applicant: AT&T Intellectual Property I, LP, Atlanta, GA (US)

(72) Inventors: Shane Michael Elliot, Farmers Branch, TX (US); Blaine Thomas, Allen, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 14/021,241

(22) Filed: Sep. 9, 2013

(65) Prior Publication Data

US 2014/0011496 A1 Jan. 9, 2014

Related U.S. Application Data

(63) Continuation of application No. 13/548,782, filed on Jul. 13, 2012, now Pat. No. 8,532,580, which is a continuation of application No. 13/315,772, filed on Dec. 9, 2011, now Pat. No. 8,254,848.

(51) Int. Cl.
*H04W 24/06* (2009.01)
*H04B 17/00* (2006.01)
*H04B 7/02* (2006.01)
*H04W 24/08* (2009.01)

(52) U.S. Cl.
CPC ........... *H04W 24/06* (2013.01); *H04B 17/0025* (2013.01); *H04W 24/08* (2013.01); *H04B 7/022* (2013.01)

USPC .......................................... 455/423; 370/252

(58) Field of Classification Search
None
See application file for complete search history.

(56) References Cited

U.S. PATENT DOCUMENTS

| 8,160,501 | B1 * | 4/2012 | Hyde et al. ................. 455/67.14 |
| 8,315,620 | B1 * | 11/2012 | Williamson et al. .......... 455/418 |
| 2004/0185904 | A1 * | 9/2004 | Yamakita ...................... 455/560 |
| 2010/0260146 | A1 * | 10/2010 | Lu ................................. 370/331 |
| 2012/0052893 | A1 * | 3/2012 | Ando et al. .................... 455/507 |
| 2012/0178483 | A1 * | 7/2012 | Rosenau ........................ 455/509 |
| 2012/0196543 | A1 * | 8/2012 | Andersson et al. ........ 455/67.11 |

* cited by examiner

Primary Examiner — Marcos Batista
Assistant Examiner — Frank Donado
(74) Attorney, Agent, or Firm — Abel Law Group, LLP

(57) ABSTRACT

A distributed antenna system (DAS) provides a plurality of DAS coverage areas for a wireless network. A plurality of statically deployed monitoring devices, each of which includes at least one radio frequency (RF) transmitter/receiver, are configured to run application tests, for example, for voice, messaging, or locations-based services, to provide testing of the wireless network to thereby generate test information related to the wireless network. An evaluation component and a control component respectively analyze the test information and adjust one or more parameters of the wireless network based on the test information.

17 Claims, 6 Drawing Sheets

MONITORING SYSTEM FOR DISTRIBUTED ANTENNA SYSTEMS

CROSS-REFERENCE TO RELATED APPLICATION(S)

This application is a continuation of U.S. patent application Ser. No. 13/548,782, filed Jul. 13, 2012, entitled "Monitoring System for Distributed Antenna Systems," naming inventors Shane Michael Elliott and Blaine Thomas, which is a continuation of U.S. patent application Ser. No. 13/315,772, filed Dec. 9, 2011, entitled "Monitoring System for Distributed Antenna Systems," naming inventors Shane Michael Elliott and Blaine Thomas, which applications are incorporated herein by reference.

BACKGROUND

1. Field of the Invention

This application relates to wireless communications and more particularly to monitoring performance of wireless communication systems.

2. Description of the Related Art

Conventional wireless communication systems communicate over a cellular network with mobile communication devices, such as cellular telephones, mobile computers, tablets, and other communication, computing, and consumer devices. Conventional cellular systems provide communication services to the communication devices over wide areas, such as cities, using multiple transmission towers transmitting to respective macro cells. However, certain environments may have poor coverage due to geography, buildings, or other impediments to wireless services. In order to address such coverage issues, and provide enhanced communication capabilities over a relatively small geographic region, distributed antenna systems (DAS) have been deployed.

Distributed antenna systems include a plurality of spatially separated antennas to provide wireless communication services for a limited coverage area. The coverage area of the DAS network may be a campus, stadium, office building, or other such limited geographic location or structure. The power provided to each antenna is typically less than that provided to a transmitter of a conventional cellular system since the coverage area of each antenna is much smaller than a conventional macro cell.

Monitoring performance of conventional wireless networks to evaluate and adjust resource utilization to improve performance can be difficult. Monitoring of DAS networks can be even more problematic where the DAS networks are deployed in limited geographic areas, such as an office building or stadium.

Accordingly, improvements in monitoring network performance are desirable.

SUMMARY

In an embodiment a distributed antenna system (DAS) provides a respective plurality of DAS coverage areas to provide at least a portion of a wireless network. A plurality of statically deployed monitoring devices, each of which includes at least one radio frequency (RF) transmitter/receiver, are configured to run application tests to provide testing of the wireless network to thereby provide test information related to the wireless network. A control component is responsive to the test information to cause adjustment to one or more parameters of the wireless network.

In another embodiment a method is provided that includes running tests using a plurality of statically deployed monitoring devices that test one or more of voice, data, and messaging services provided by a network that includes a distributed antenna system (DAS) including a plurality of DAS antennas to generate test information related to the network. One or more parameters of the network are adjusted based on the information.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
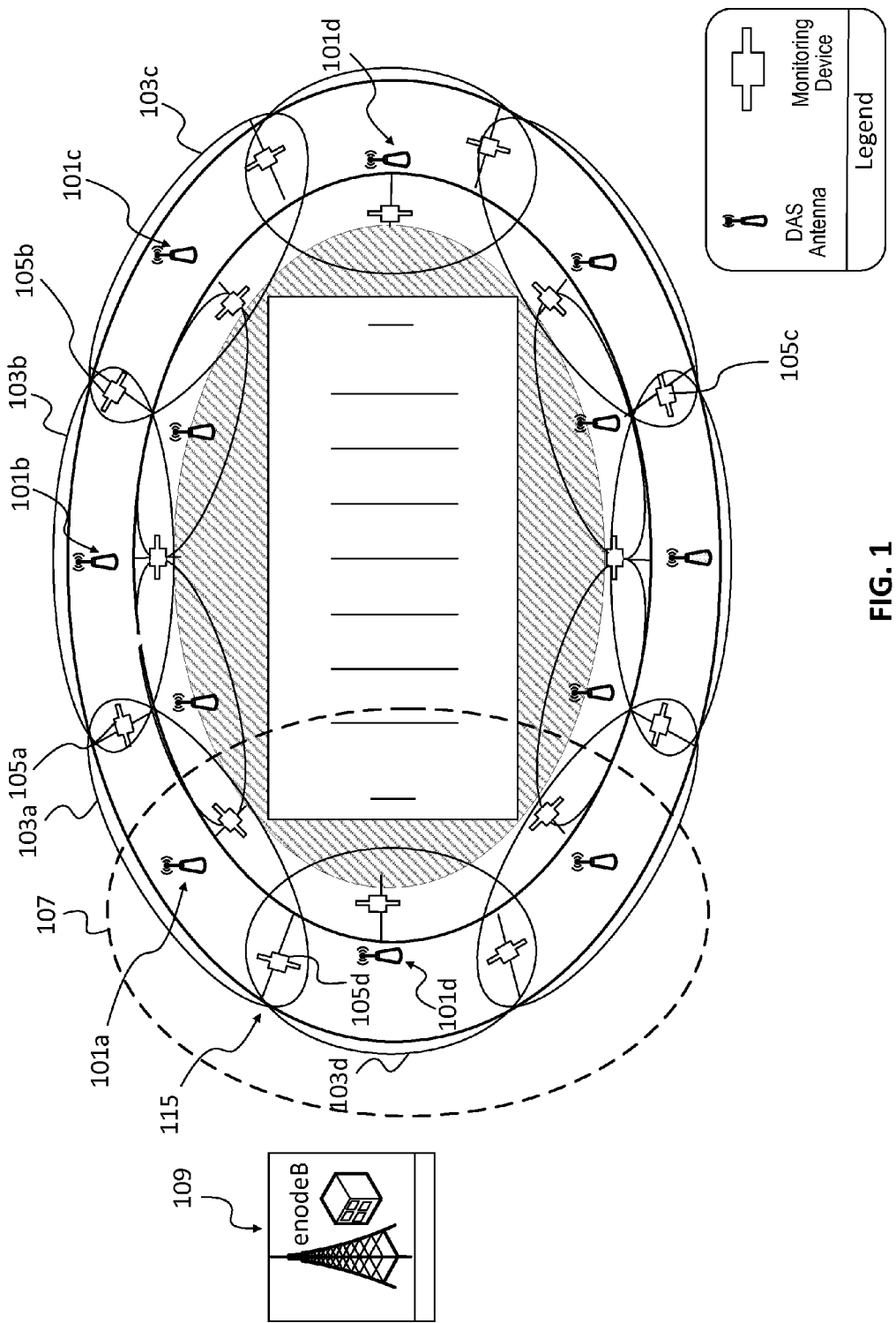
FIG. 1 illustrates an embodiment in which a DAS deployment and monitoring devices are located in a stadium.

FIG. 1 illustrates an illustrative embodiment in which a distributed antenna system is deployed in a stadium venue. The distributed antenna system includes antennas, which in an embodiment may provide a multi-band antenna capability to communicate over various frequency bands, such as 700 MHz, 850 MHz, 900 MHz, 1900 MHz, 2100 MHz, 2400 MHz, and 5000 MHz. The various frequency bands may correspond to various wireless telecommunication technologies including Worldwide Interoperability for Microwave Access (WiMAX); Enhanced General Packet Radio Service (Enhanced GPRS); Code Division Multiple Access (CDMA) 2000; Third Generation Partnership Project (3GPP or 3G); Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced. In addition, the wireless technologies supported by the deployed DAS may include Wi-Fi or Wireless Fidelity, based on IEEE 802.11 (a, b, g, n, etc.).

Each of the DAS antennas 101 (101a, 101b, 101c, 101d) provides a coverage area 103 (103a, 103b, 103c, 103d) associated with its respective antenna. For ease of illustration, only a subset of the DAS antennas is labeled. The DAS network may provide wireless communication services for devices, such as cellular telephones, smart phones, tablet computers, personal computer (PC), or other wireless devices. The wireless devices can communicate with the DAS network through various wireless communication technologies, e.g., the wireless communication technologies described above. As described further herein, the antennas of the DAS are coupled to the carrier network through a transport medium coupling the antennas to, e.g., a base transceiver station (BTS (for GSM)), a NodeB (a UMTS equivalent base station), an eNodeB (an LTE equivalent base station), and through the base station to the remainder of the carrier network.

The system illustrated in FIG. 1 may also include a macro cell 107 that provides communication services from a tower 109, coupled to the carrier network through conventional mechanisms. Note that the macro cell 107 overlaps with the coverage provided by at least some of the DAS antennas.

The system illustrated in FIG. 1 also includes a plurality of monitoring devices 105 (105a, 105b, 105c, 105d). The monitoring devices are configured, as explained more fully herein, to execute scripts that test various aspects of the radio network provided by the DAS radio network. The monitoring devices are static and may be mounted on any suitable structure, such as a pole, wall, or other mounting location. In an embodiment, the monitoring devices are configured to test multiple types of communication services such as voice, data, messaging, and location-based services, for various communication technologies, such as GSM, GPRS, EDGE, CDMA2000, LTE, WiMAX, and WiFi. Based on the results of the tests, utilization of network resources and network performance can be evaluated and various parameters of the DAS network and the macro cell(s) may be adjusted to provide improved network performance and thus a better user experience in the coverage area provided by the DAS network.

Figure 2:
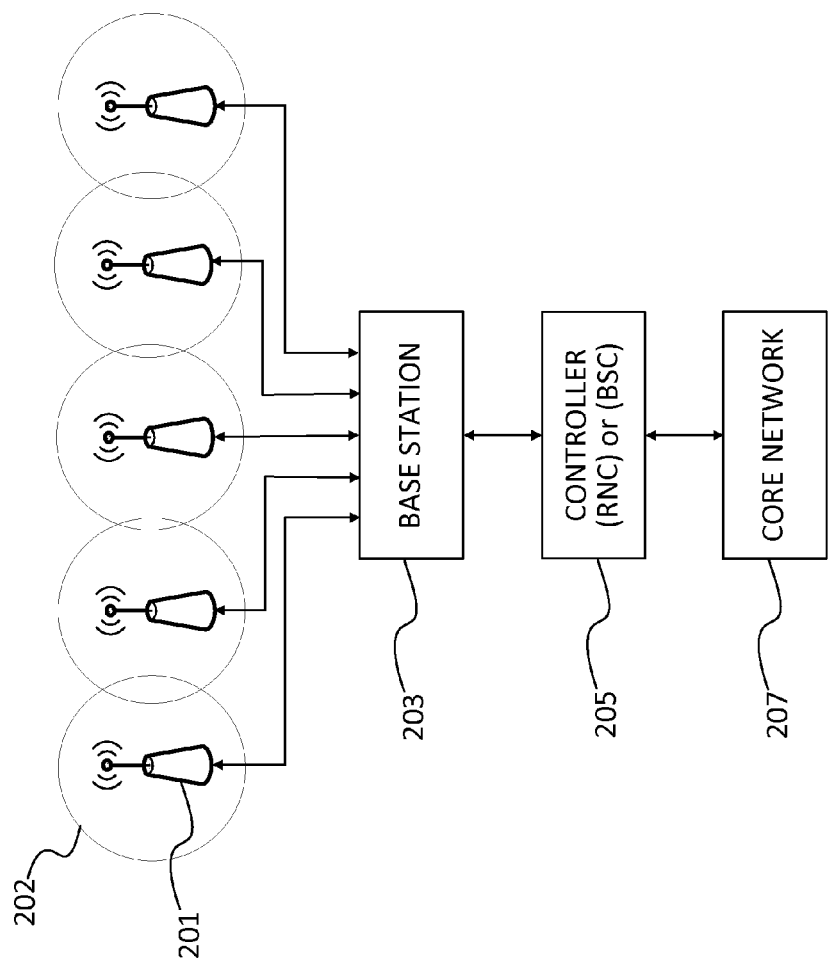
FIG. 2 illustrates a high level block diagram of a DAS network.

FIG. 2 illustrates a high level block diagram of an illustrative DAS network. The network includes a plurality of DAS antennas 201 providing coverage areas 202, coupled to a base station 203. A controller 205, which may be, e.g., a radio network controller (RNC) or base station controller (BSC), depending on the telecommunications technologies deployed, couples the antennas 201 to the core network 207. The antennas 201 typically transmit with less power than a macro cell tower, shown e.g., in FIG. 1.

Figure 3B:
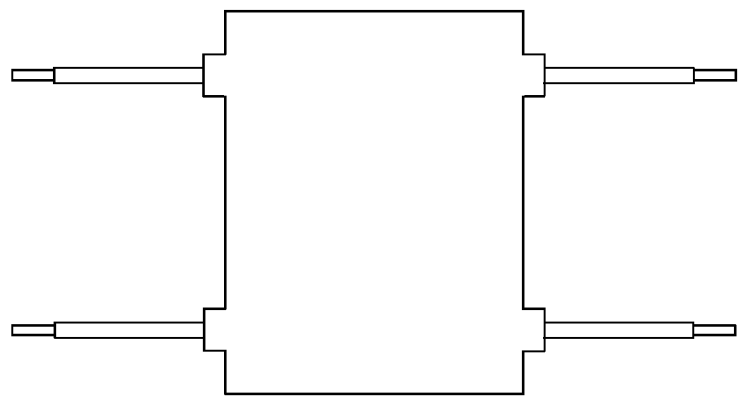
FIG. 3B illustrates an illustrative monitoring device in a waterproof enclosure suitable for pole or wall mounting.
Figure 3A:
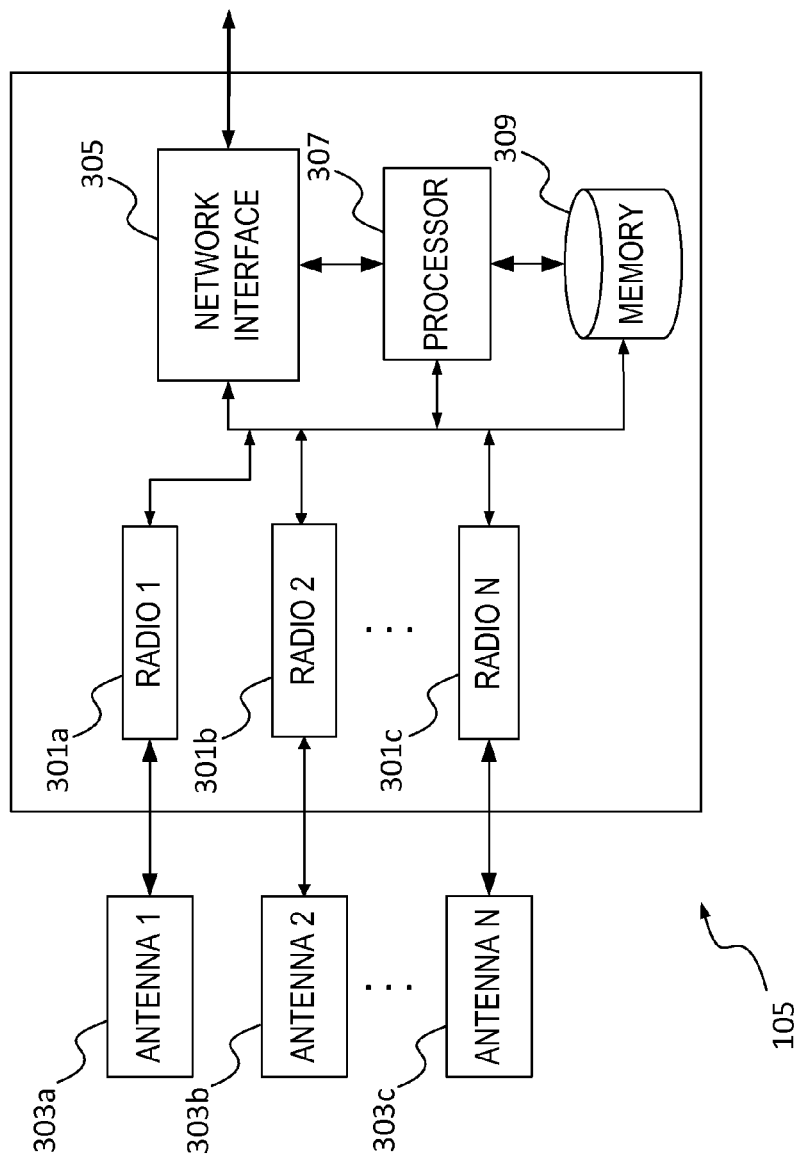
FIG. 3A illustrates a high level block diagram of an illustrative monitoring device.

Referring to FIG. 3A, illustrated is a high level block diagram of an illustrative monitoring device 105. The monitoring device may include a number of radios 301a, 301b, and 301c (radio 1 to radio N) to communicate over various frequency bands using various RF technologies. The radios may be provided by, e.g., wireless cards for, e.g., 802.11/GSM/UMTS. In at least one embodiment the monitoring device supports multiple frequency bands which may include, e.g., 700 MHz, 850 MHz, 900 MHz, 1900 MHz, 2100 MHz, 2400 MHz, and 5000 MHz. The various frequency bands may correspond to various wireless telecommunication technologies including Worldwide Interoperability for Microwave Access (WiMAX); Enhanced General Packet Radio Service (Enhanced GPRS); Code Division Multiple Access (CDMA) 2000; Third Generation Partnership Project (3GPP or 3G); Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced. In addition, the wireless technologies supported by the deployed DAS may include Wi-Fi, or Wireless Fidelity, based on IEEE 802.11 (a, b, g, n, etc.). The various radios allow the device to test various wireless communication technologies. One or more of the radios may operate on multiple frequency bands as is known in the art.

The illustrative monitoring device includes at least one network interface circuit 305 that allows wired communication over, e.g., an Ethernet connection. In addition or alternatively, universal serial bus (USB) and other serial or parallel communication interfaces may be provided. The device may be able to test particular wireless communication technologies, e.g., on UMTS and/or LTE, using one or more of the radios and report test results over an out-of-band communication path. The out-of-band communication path may be, e.g., through network interface circuit 305 over an Ethernet connection or via a WiFi connection. The out-of-band communication path allows test results to be reported without causing additional traffic for the wireless communication technology being tested. The monitoring device includes a processor 307 and a memory 309. While a single processor and single memory is shown in FIG. 3A, the device may have multiple memories. For example, memory 309 may represent various types of memories including dynamic random access memory (DRAM), electrically erasable programmable read only memory (EEPROM), read only memory (ROM), one time programmable (OTP) memory, magnetic memory, such as hard drives and/or optical storage. The processor 307 may represent various types and numbers of processors suitable to the particular applications the monitoring device is intended to test. For example, the processor 307 may represent both a microcontroller and a digital signal processor utilized to perform signal processing functions associated with one or more of the radios. The processor 307 may be used to execute test scripts stored in memory 309 to cause the radios to test aspects of the RF network as described further herein.

FIG. 3B illustrates an illustrative monitoring device in an enclosure containing the monitoring device circuitry shown in FIG. 3A. The enclosure may provide waterproof capability for pole or wall mount of the monitoring device in an indoor or outdoor location. In FIG. 3B, the embodiment includes four antennas, but other numbers of antennas may be utilized according to the requirements of the specific monitoring device embodiment and the telecommunication technologies being tested.

Figure 4:
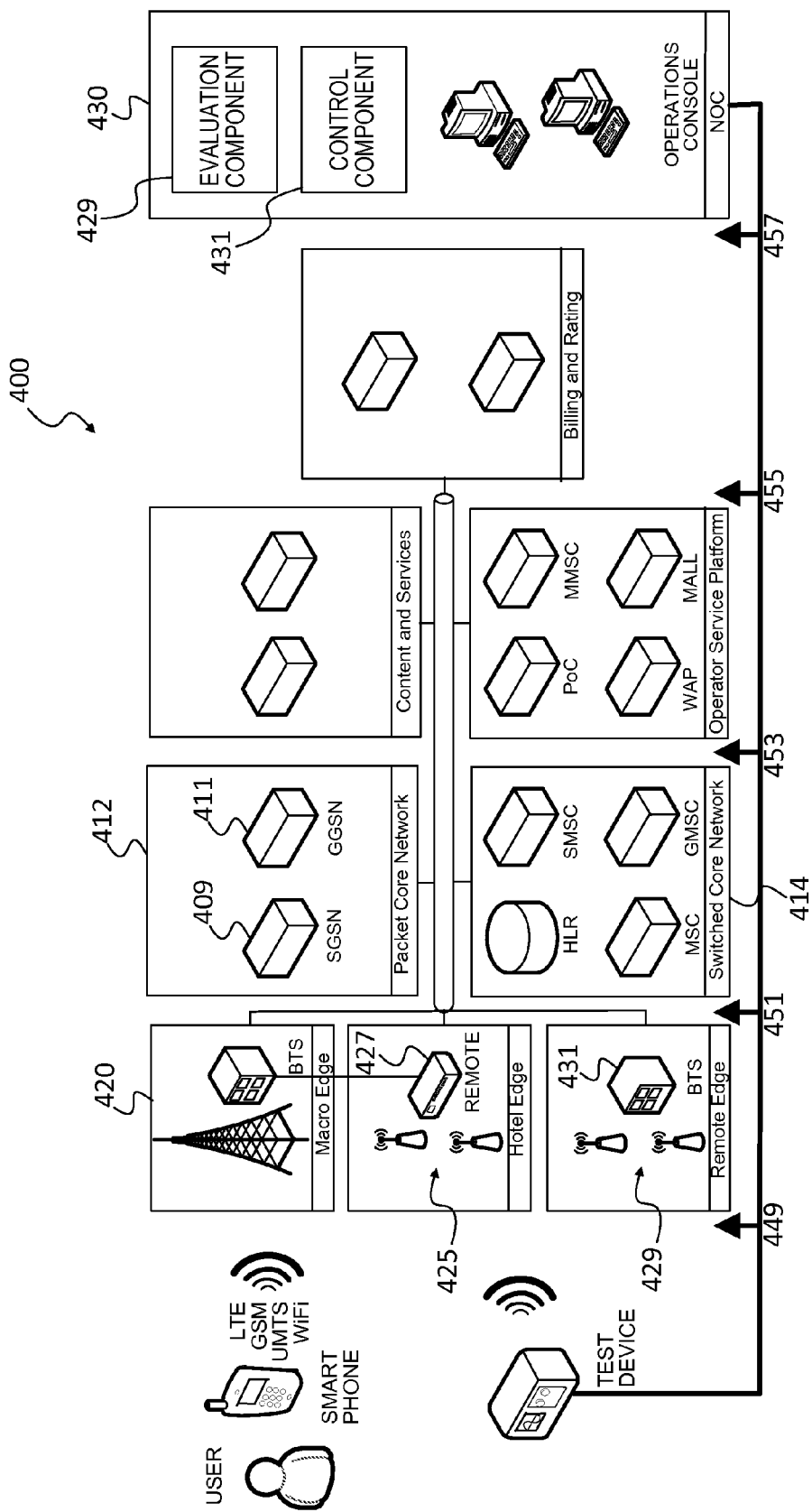
FIG. 4 illustrates an illustrative carrier network associated with the DAS deployment of FIG. 1.

FIG. 4 illustrates an illustrative carrier network that may support communications for the coverage area shown in FIG. 1. The illustrated carrier network provides GSM, UMTS, and long term evolution (LTE) capabilities. By way of example, system 400 illustrates a Global Systems for Mobile Communication (GSM) path through base transceiver station (BTS) 420. BTS 420 also represents other types of base stations, such as a nodeB providing a High Speed Packet Access (HSPA) path or an eNodeB providing a Long Term Evolution (LTE) path. System 400 further includes core carrier network components. An HSPA path can include, for example, a NodeB, Radio Network Controller (RNC) (not separately shown in FIG. 4), Serving GPRS Support Node (SGSN) component 409 and Gateway GPRS Support Node (GGSN) component 411. An illustrative LTE path can include an eNodeB and network components such as Serving Gateway (SGW) and Mobility Management Entity (MME) components and public data network (PDN) gateway component (MME and PDN not shown in FIG. 4 for ease of illustration). DAS antenna components 425 may couple to the base station 420 through a telecommunications component 427 that provides necessary repeater or amplification for the signals to and from the DAS antennas. In an embodiment, at least some of the DAS antennas nodes may be coupled to their own base station 431 and through the base station to the core network. In such an embodiment, repeaters may not be needed. While FIG. 4 shows one embodiment of a carrier network, the DAS network shown in FIGS. 1 and 4 may be operable in multiple carrier networks having technologies that may not be shown in FIG. 4.

Referring back to FIG. 1, in a venue, such as a stadium during a sporting or other event, high numbers of portable communication devices are present, putting a tremendous strain on the network resources available at the venue. The monitoring devices may be configured to run test scripts that exercise various aspects of the telecommunications network, such as voice, messaging, and location-based services. Based on test results, parameters of the telecommunications network may be adjusted to better exploit the available resources of the network.

For example, one test script may cause a particular monitoring device to test voice services. The test script causes the monitoring device to get a connection, dial a test server, and verify that a voice connection has been established. Success or failure of the test may be determined by the time required to complete the test, which may be stored in memory on the monitoring device for subsequent transmission to a control component as described further herein. If the test does not complete, a time-out function may be utilized to determine failure of the test. The test may be repeated for various technologies available in the network, e.g., GSM, UMTS, and LTE. Based on the time to complete the test, network latency associated with the particular tested network service, such as voice, can be determined.

The test results may be reported out-of-band to the appropriate control component so as to not further load the network being tested. For example, the test results may be reported using the Ethernet interface present in the monitoring device for transmission over a network, to a local or remote collection component as described further herein that collects test results from multiple monitoring devices. The remote collections component may be an evaluation component that receives all the test results from the monitoring devices directly or indirectly through other monitoring devices. Thus, the test results may be reported, e.g., over WiFi to another monitoring device with an Ethernet connection for reporting to the collection component. If those reporting paths are not available, the test results may be reported over one of the network paths being tested. A priority may be assigned to particular reporting paths with the highest priority being the path, e.g., that least loads the network. Thus, in an embodiment, the highest priority reporting path could be the Ethernet with the second highest reporting path being WiFi, then GSM, UMTS, and LTE. In an embodiment, the priority of the reporting path may be determined dynamically based on loading. For example, if a GSM frequency band is not heavily loaded, that reporting path may be preferred over UMTS or LTE. While the Ethernet and WiFi connections allow for reporting of tests, the reporting paths may also be used to write to the monitoring devices to load new tests into monitoring devices or adjust parameters of the monitoring devices, such as preferred reporting paths. The monitoring devices may be configured to run particular tests with particular frequencies. Thus, e.g., at a venue the monitoring devices may be configured to turn on an hour before the event starts and run tests with a particular frequency or at particular times, or loop tests in a particular order.

Another test script may cause a monitoring device to test messaging services. In the test, the monitoring device opens a short message service (SMS) application. The script causes the monitoring device to send a text message to a particular phone number, which may be a phone number associated with a server in the carrier network. The test message sent by the monitoring device may have a particular pattern of numbers and/or letters. The receiving device may send back a different pattern of numbers and/or letters. Receipt of the second pattern may indicate a successful test. A time-out may be used to indicate failure of the test. Both the success/failure of the test and the time to complete may be stored as test results in the memory of the monitoring device for subsequent communication to the appropriate control component in the network. The message may of course include content other than just text, such as multimedia content, according to the particular aspect of the system being tested. The SMS related test may be repeated for the various communication technologies supported in the venue, such as GSM, UMTS, and LTE, according to their capabilities. Further, while in some embodiments the tests may be directed to a single carrier network, in other embodiments, the tests are directed to test networks associated with networks of multiple carriers. In that way, in situations where service agreements allow multiple carriers to use the DAS network, congestion across multiple carriers may be tested. Based on the time to complete the test, network latency associated with the particular tested network service, such as messaging, can be determined. The latency may be associated with loading of the network. If the latency is long, the network can be assumed to be heavily loaded, and turning on extra antennas or shifting spectrum from the macro cell to the DAS network may prove beneficial.

In addition, while the destination address for a particular test may be external to the coverage area provided by the DAS antenna nodes, in other tests the monitoring devices may send voice, messaging, and other tests to other monitoring devices in the venue with the monitoring devices responding in an appropriate manner to provide a voice connection or messaging response.

In still other tests, location-based services may be tested. A script may be run that requests a location-based service be provided by the network. A predefined indication of a location-based service from the network, assuming the location of the monitoring device was successfully determined, may be provided by the network. Based on receipt or lack thereof of that predefined indication of service, the test can be determined to be a success or failure. A time-out may be used to indicate a failure if the predefined indication of a location-based service is not received within the necessary time. Time to complete the test may be used as an indication of latency.

Referring still to FIG. 1, in the illustrated embodiment the monitoring devices can be seen to be placed in overlapping coverage areas. For example, coverage area 103a provided by DAS antenna 101a overlaps with coverage area 103d provided by DAS antenna 101d. In addition, macro cell 107 provided by transmitter 109 overlaps with multiple coverage areas of the DAS antennas. One aspect of the communication network that can be particularly wasteful of network resources in a communication environment, such as shown in FIG. 1, is soft handovers. During soft handovers, a mobile device is connected to two transmitting antennas. For example, the DAS antennas may not be able to overcome the noise floor present in the venue environment. As a result, the mobile device may try to find a better signal, which can be provided by macro cell 107. But many mobile devices may try to do the same thing at the same time, making communication using the macro cell very difficult. Accordingly, in one aspect, when a soft handover rate is determined to be too high, appropriate action is taken to try to reduce the rate of soft handovers as described further herein.

Each of the monitoring devices may have a specific identification (ID) that allows the carrier network to identify them. One or more probe components in the network may be turned on at particular times that parse network traffic for particular IDs associated with the monitoring devices. In an illustrative embodiment, the test case, as defined on the monitoring device, executes and triggers the indicated probe(s) to start monitoring specific traffic associated with a particular test case. At the end of the test case, the monitoring device triggers the indicated probes to stop monitoring the specific traffic related to the monitoring device test case. Having IDs uniquely associated with the monitoring devices allows communications associated with each monitoring device to be tracked at various locations using probe components. The probe components are represented at a high level as probe components 449, 451, 453, 455, and 457 and are associated with various locations of the network. The probe components may be stored in the various network locations they are utilized. Thus, e.g., multiple probe components may reside in the packet core network 412 and the switched core network 414 to track information flow through the network. The particular probe components that are turned on may be unique to the particular test case. Thus, for example, a short message service (SMS) test case may turn on multiple probes in the switched core network 414, e.g., at the mobile switching center (MSC) and short message service center (SMSC) in the switched core network and multiple probes in the packet core network 412, e.g., at the SGSN 409 and the GGSM 411. The probe components may be turned on by the monitoring device sending a message to a particular universal resource locator (URL) address. The content of the message or the particular address may be used to indicate which probe components to enable. Operating specific probe components during the tests allows data collected from both the monitoring devices and the probe components to be analyzed and appropriate decision made to enhance coverage in areas covered by the monitoring devices.

An evaluation component 429 receives the test results including the probe results associated with the tests. The test results are then correlated by the evaluation component 429 to "paint" the picture of the performance of the network end to end. The evaluation component 429 evaluates the test results to determine what changes to make to improve performance. The evaluation component 429 may reside centrally at the network operations center 430 (see FIG. 4) as shown or elsewhere in communication with a suitable control component 431 to affect the necessary changes in network parameters. The evaluation component can generate a detailed picture of spectrum use that can be exploited to more efficiently allocate the available spectrum. For example, as the evaluation component detects that traffic is getting heavier, e.g., as the venue begins to fill with people, more DAS antenna sites can be enabled. During half-time of a sporting event, more DAS antennas can be turned on in the vicinity of concessions and bathrooms to accommodate the surge in mobile devices present in those locations. Further, based on the results from individual ones of the monitoring devices, the specific locations in terms of level or seating area that need extra resources in terms of power, spectrum, and/or number of DAS antennas can be identified. Further, the antenna tilt of the macro tower can be adjusted. Power of the macro tower(s) and/or the DAS network may be adjusted to provide additional resources to particular coverage areas. As the venue fills up, additional power may be directed from the macro tower to the DAS antennas. As the venue empties, the opposite may take place, where additional power is directed to the macro tower and the power used by various ones of the DAS antennas may be reduced or the antennas completely powered off.

The collection of all of the data from the monitoring devices allows for accuracy in determining which sector and/or antenna is having a specific performance issue. Because of advancements in the DAS radio equipment, there are configuration capabilities in the DAS equipment that can influence overall DAS performance. These configurations are changed based on specific data points collected from the monitoring device dependent on the affected services. For example, assume there is a centrally located concession stand in a sports stadium. During the game, the performance of this sector is performing within its normal operating range. During half-time, this sector's network performance goes below what is considered acceptable. A determination can be quickly made as to what other sector(s) in the sports stadium are operating well above an acceptable level. The spectrum being utilized by those sector(s) operating well above an acceptable level can be bisected with a configuration change in the DAS equipment to move spectrum from the sector that was operating above acceptable and moved to the sector that was operating below normal. That may be accomplished by dividing the concession sector further and adding spectrum to the affected sector. The evaluation component 429 may determine the soft handover rate is too high based on the number of failures from one or more of the monitoring devices over a particular time period. The evaluation component may determine that the latency through the network is inadequate based on probe data and/or test results.

Once it is determined that soft handover rate, or poor network performance is occurring, based on the test data collected by the devices or by the probes in the network, a control component 431 in Network Operations Center 430 (FIG. 4) can be used to adjust parameters associated with the DAS and/or the macro cell such as increased antenna amplification in the affected DAS sector(s), add antennas in the affected DAS sector(s), bisect DAS sector(s) into additional DAS sectors to add spectrum, decrease antenna amplification at the macro tower or adjust antenna tilt. Such parameters are intended to be illustrative and other parameters may be utilized to improve system performance depending on the particular system and the parameters available to tune system performance.

The control component 431 may be implemented on one or more computer systems using software operating on the one or more computer systems in conjunction with necessary hardware for receiving requested actions from the evaluation component 432 and providing control information to the DAS antennas and/or macro cell towers to adjust parameters to improve performance. While shown as located in network operations center 430, the control functionality may be distributed through the system as is appropriate to the particular network being monitored. Similarly the evaluation component 429 may be implemented on one or more computer systems using software operating on the one or more computer systems in conjunction with necessary hardware for receiving test results and probe results and providing requested actions to the control component 431. The evaluation component may also provide management of the monitoring devices by, e.g., providing test scripts and configuring various aspects of the monitoring devices. The control and evaluation components, while shown as separate components, may be combined and operate on a single computer system. Alternatively, the evaluation and control components may be remote from each other.

While a DAS venue deployment with the monitoring devices, such as shown in FIG. 1, illustrates one embodiment, deploying the monitoring devices in conjunction with a DAS deployment may be utilized in other DAS deployment scenarios. For example, DAS networks may be deployed in office buildings, campuses, and other places where it may be difficult to build macro towers or coverage by macro towers is otherwise limited. Thus, referring to FIG. 5, an embodiment provides the monitoring devices in various "neighborhoods" in which a DAS deployment has taken place. The "neighborhood" may be a building, campus, venue, or other area in which a DAS deployment is suitable. The monitoring devices 503 monitor the network in a manner described in association with FIG. 1. Thus, the monitoring devices may execute scripts that cause the monitoring devices to test network services, such as voice, messaging, location-based services, and loading, soft handoff, bandwidth, and other criteria associated with the DAS network. A group of the monitoring devices communicate with a site collector 505 that interacts with the monitoring device to collect test information, provide tests to the monitoring devices, schedule tests and otherwise manage the monitoring devices. The site collector can collect status from the various monitoring devices, and/or deploy new test scripts or a special test script to obtain additional data about a particular aspect of the system. The site collector can evaluate key performance indicators. Thus, the site collectors may provide management of the monitoring devices. Alternatively, the individual monitoring devices may be managed from a more remote location, such as from an evaluation component, such as dashboard 507.

Dashboard 507 represents the evaluation component such as evaluation component 429 in FIG. 4 and includes such functionality as collecting the test data from the various site collectors and the network probes (see FIG. 4), storing the test data in a database, and analyzing the test data. The dashboard may determine whether certain threshold(s), associated e.g., with key performance indicators that are unique to the network, in terms, e.g., of soft handover rate or latency are being met, and if not, request that appropriate control is exercised over the network to improve performance in ways described herein. In addition, the evaluation component can provide for test case design and for forwarding test cases to the site collectors for distribution to the monitoring devices. The dashboard may provide the site collectors with certain thresholds for analyzing data or key performance indicators. The allocation between management functions between functionality closer to the devices and more centrally located may be based on the configuration of the particular systems being controlled and the capabilities of the network.

Figure 5:
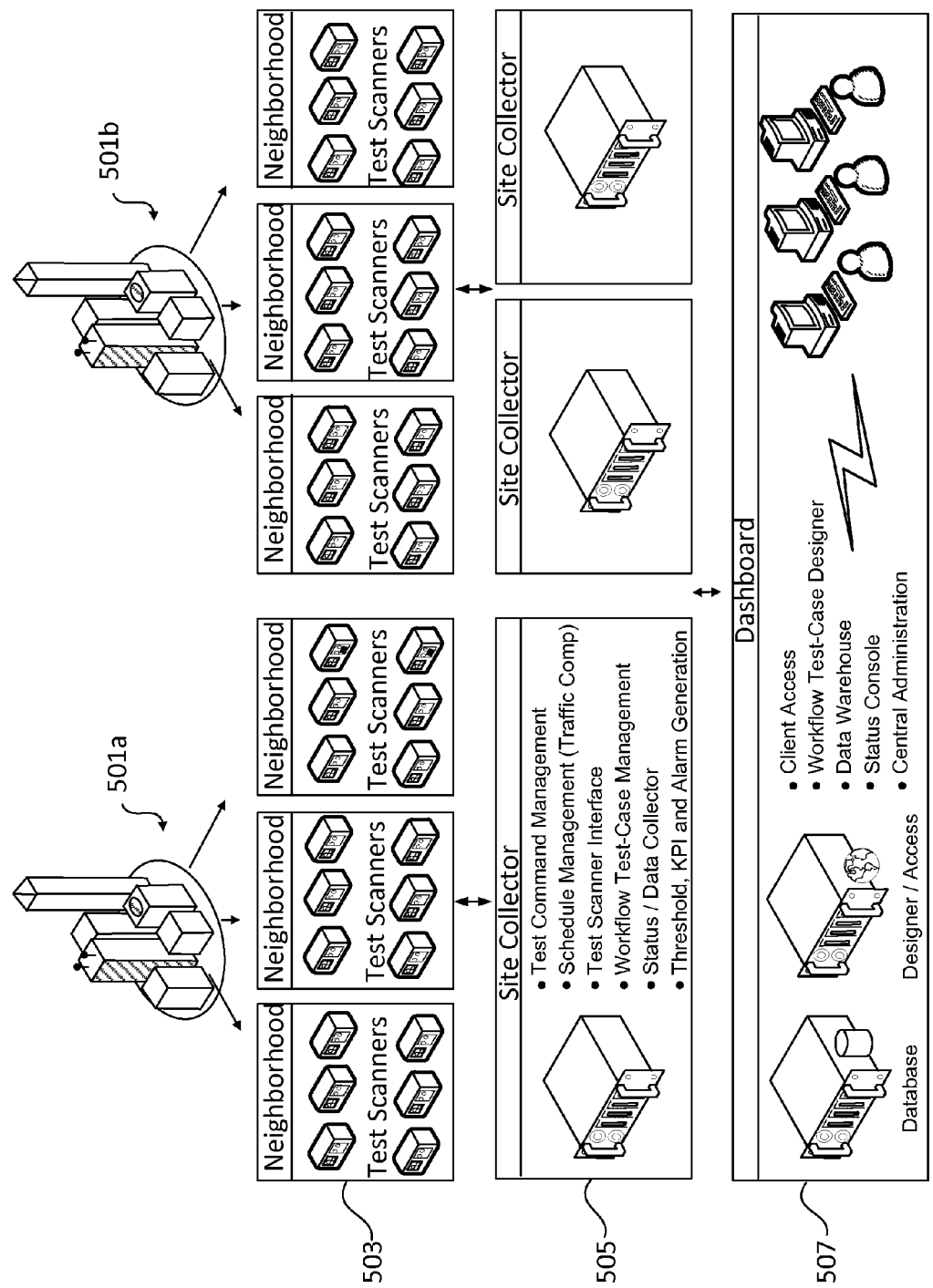
FIG. 5 illustrates a distributed architecture of an illustrative DAS deployment with monitoring devices.

Because of the diverse network monitoring suites available, one advantage of the architecture shown in FIG. 5 is that the architecture may be data only in design to allow for any system to interface with a standard application programming interface (API) to easily integrate the monitoring architecture into a diverse enterprise system architecture. While data parameters are collected on the test cases, they may not necessarily be converted into specific key performance indicators (KPIs) or faults within the monitoring system (e.g., the monitoring devices and site collectors). Definitions of such KPIs and faults may be determined by the interfacing enterprise systems such as the network shown in FIG. 4.

Consider a simple SMS test case involves a monitoring device sending a SMS message with a pattern, e.g., "1111111111". The receiving end responds with another pattern, e.g., "0000000000". The monitoring device records such information as the start time of the test, the time that message was sent, the time the message was received and the conclusion of the use case. The determination of the acceptable duration of each of these time intervals, along with any intervals associated with probe data, may be determined outside of the monitoring architecture. Thus, the time stamps are determined by the test and evaluated externally to the monitoring devices. The monitoring device may only conduct the test case and record the defined data parameters. By turning on various probes, the network data may also be analyzed.

In an embodiment, the monitoring devices do not use scheduling of test cases by defined times. Instead, the monitoring devices may use an always-on approach. The run-time window test cases are defined and managed centrally and retrieved by the monitoring device. The monitoring device may have a configuration file which determines how often it "phones home" to check for a new operating file. This operating file contains such information as the run-time window, test cases and test case list/loop it should run. The run-time window tells the monitoring device on which days and which time frames it should run the appropriate test case lists. This is a many-to-many relationship: multiple run-time windows to multiple use case lists. For example: Run-Time Window 1—08:00-20:00 Loop Test case list 1. This test case list could be 1,2,1,3,1,4,1,1,5,4,1,6. Notice that use test 1 is listed more often in the list to increase its run interval. The monitoring device would loop this list continuously during the run-time window. Thus, for an afternoon sports match, the run-time window may specify 10:00 to 18:00 on Saturday with the appropriate test case list.

The monitoring devices in the neighborhoods perform the same function as those in the venue shown in FIG. 1, providing information as to the operation of the network. The information can be used to adjust parameters of the network being observed by the monitoring devices to better exploit available network resources, such as spectrum, antennas, power, and antenna tilt. For example, the monitoring devices associated with a deployment in an office building or office campus may detect very light loading nights and weekends, allowing more power and spectrum to be allocated to macro towers serving adjacent residential neighborhoods. Similarly, during the workday, macro cells associated with residential neighborhoods may have some of their spectrum allocated towards the DAS antennas.

Figure 6:
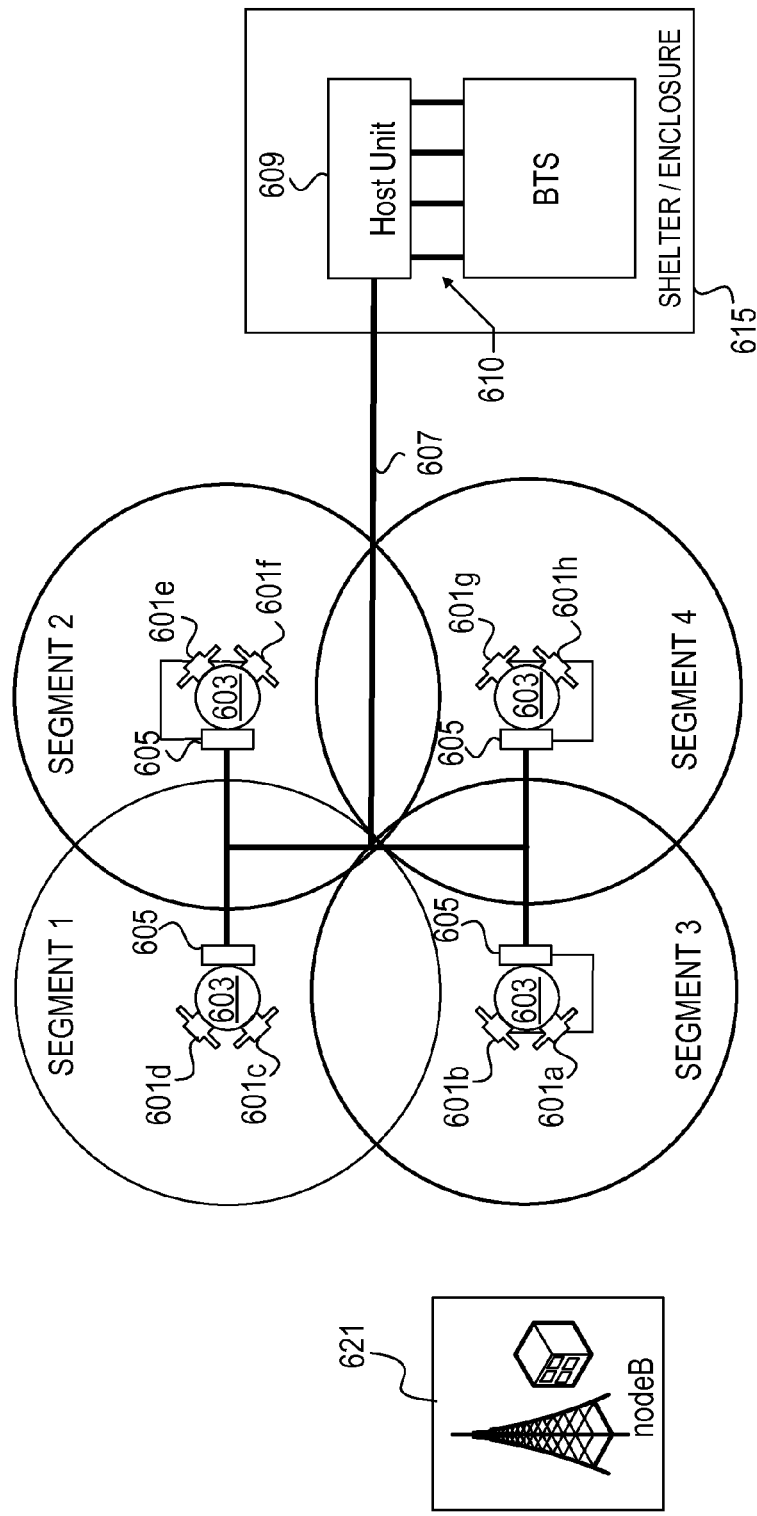
FIG. 6 illustrates an outdoor deployment of monitoring devices according to an embodiment.

The DAS deployment and accompanying monitoring devices may be deployed outside or inside. Referring to FIG. 6, an embodiment illustrates monitoring devices 601a-601f, deployed on poles 603. The monitoring devices deploy the segments 1-4 representing segment coverage areas provided by antennas. Note that the DAS antennas (not shown in FIG. 6 to simplify the figure) are coupled to communications circuit 605 and may be pole-mounted on pole 603 at or near the communications circuit 605. Referring to segment 3, the monitoring devices 601a and 601b are mounted on pole 603. Communications circuit 605 may be associated with DAS equipment and provide a way to convert optical signals provided over optical fiber 607 from a host unit 609 to radio frequency (RF) signals from transmission over the DAS antenna, and RF signals received on DAS antennas may be converted to optical signals from transmission back to host 609. The host unit 609 communicates with base transceiver station 611 over coaxial cables 610. The host unit and BTS 611 may be disposed in a shelter/enclosure 615. An Ethernet cable 617 allows the monitoring devices to communicate over the Ethernet via communication circuit 605 to the base transceiver station and through the BTS to appropriate monitoring device controllers. Note that the devices may be powered over Ethernet or powered over POTS in the manner of a conventional telephone.

The monitoring devices may communicate in a mesh network or an ad hoc network formed by the monitoring devices when other communication paths for a particular monitoring device are unavailable. For example, WiFi may be used to communicate test information from monitoring devices 601j and 601k to another of the monitoring devices, since test devices 601*j* and 601*k*, in the embodiment illustrated, lack an Ethernet connection. Thus, to simplify installation, and provide flexibility, only some of the monitoring devices may have an Ethernet connection and are able to communicate over WiFi or other communication path with an adjacent monitoring device. In other installations, a mesh network is entirely implemented using WiFi or other wireless communication technology.

As used in this application, the term "component," is intended to refer to one or more specific functionalities, in which the component can be either hardware, such as a hardware associated with a computing system including one or more processors, or a combination of hardware and software as part of a computing system, or software in execution on a computing system or stored in computer readable media for execution. Thus, the various entities or components described herein, such as dashboard 507, evaluation component 429, control component 431, and the probe components, may be considered components. Both an application running on a computing system, such as a server or network controller, and the computing system may be a component. One or more components may reside within one or more applications and a component may be localized on one computer system and/or distributed between two or more computer systems. Components may communicate via local and/or remote access protocols over local or remote networks. Thus, test results may be analyzed by one or more computer systems such as dashboard 507 and the results of that analysis communicated to one or more other components to control the network to affect changes in the network related to the macro cells or DAS sectors.

As it employed in the subject specification, the term "processor" can refer to substantially any computing device including, but not limited to, embedded processors, single-core processors, or multi-core processors. Such processors are found in various computer systems from cell phones, tables, servers, and the like. Such systems typically include memory components. It will be appreciated that the memory components, or computer-readable storage media, described herein can be either volatile memory or nonvolatile memory, or can include both volatile and nonvolatile memory. Computer-readable storage media can be any available storage media that can be accessed by the computer. Computer-readable storage media can include, but are not limited to, read only memory (ROM), programmable ROM (PROM), electrically programmable ROM (EPROM), electrically erasable ROM (EEPROM), flash memory, CD-ROM, digital versatile disk (DVD), or other optical disk storage, magnetic storage including magnetic disks, or other tangible and/or non-transitory media which can be used to store desired information and can be retrieved by the processor or other component.

The description set forth herein is illustrative, and is not intended to limit the scope of the invention as set forth in the following claims. Other variations and modifications of the embodiments disclosed herein may be made based on the description set forth herein, without departing from the scope and spirit of the invention as set forth in the following claims.

What is claimed is:

1. A system comprising: a distributed antenna system (DAS), including a plurality of DAS antennas to provide a respective plurality of DAS coverage areas for a wireless network; a plurality of statically deployed monitoring devices, each of the monitoring devices including at least one radio frequency (RF) transmitter/receiver, the monitoring devices configured to run application tests to provide testing of the wireless network to thereby provide test information related to the wireless network, the application tests include testing of messaging services, wherein the application tests include testing of voice, data, and short message services,
wherein at least one of the monitoring devices is configured to open a short message service application and send a first test message to a receiving device associated with the system as part of a short message service test and to receive a second test message from the receiving device and to store test results of the short message service test;
an evaluation component to evaluate the test information and determine changes to one or more parameters in the wireless network based on the test information, the test information including the test results; a control component responsive to the changes to the one or more parameters communicated by the evaluation component to cause adjustment to one or more parameters of the wireless network based on the test information; and
a macro cell transmitter/receiver providing a macro cell having a macro coverage area that overlaps one or more of the DAS coverage areas and wherein the adjustment of the one or more parameters comprises shifting spectrum from utilization by the macro cell transmitter/receiver to utilization by one or more of the DAS antennas.

2. The system as recited in claim 1 wherein the test information is reported by the monitoring devices over a plurality of paths in a path priority order that is determined dynamically based on loading of the paths.

3. The system as recited in claim 1 wherein the second test message has a different test pattern than a first test pattern of the first test message.

4. The system as recited in claim 1 wherein at least one of the monitoring devices includes a network path interface separate from the RF transmitter/receiver.

5. The system as recited in claim 1 wherein the adjustment of the one or more parameters further comprises adjusting tilt of an antenna associated with the macro cell transmitter/receiver.

6. The system as recited in claim 1 wherein the adjustment of the one or more parameters involves enabling one or more of the DAS antennas for communication or disabling one or more of the DAS antennas for communication.

7. The system as recited in claim 1 wherein the adjustment of the one or more parameters further comprises adjusting power of the macro cell transmitter/receiver.

8. The system as recited in claim 1 wherein at least some of the statically deployed monitoring devices are configured in a mesh network to communicate the test information.

9. A method comprising:
running tests using a plurality of statically deployed monitoring devices that test voice, data, and short message services provided by a wireless network that includes a distributed antenna system (DAS) including a plurality of DAS antennas, to generate test information related to the wireless network;
opening a short message service application in one of the monitoring devices;
sending a first test message as part of a short message service test from the one of the monitoring devices to a receiving device associated with a server in the network;
sending from the receiving device a second test message;
receiving the second test message at the one of the monitoring devices;
the one of the monitoring devices storing test results in memory of the one of the monitoring devices, the test results including time information associated with the short message service test;

evaluating the test information and determining changes to one or more parameters in the wireless network based on the test information, the test information including the test results;

responsive to the determined changes to the one or more parameters, adjusting the one or more parameters of the wireless network; and wherein the adjusting of the one or more parameters comprises shifting spectrum from utilization by a macro cell transmitter/receiver, having a macro cell coverage area that overlaps one or more of the DAS coverage areas, to utilization by one or more of DAS antennas.

10. The method as recited in claim 9 further comprising reporting the test information over a path selected based on a path priority order of a plurality of paths, the path priority order based on path loading.

11. The method as recited in claim 9 further comprising communicating the test information from at least one of the monitoring devices via a mesh network including another of the monitoring devices.

12. The method as recited in claim 9 further comprising adjusting at least one of a tilt of a macro cell transmitter and power of the macro cell transmitter, in response to the information.

13. The method as recited in claim 9 further comprising turning on one or more of the distributed antennas of the distributed antenna system in response to the test information.

14. The method as recited in claim 9 further comprising:

turning on one or more probe components in association with a beginning of one of the tests;

tracking information flow though the network using the one or more probe components; and turning off the one or more probe components in association with an end of the one of the tests.

15. The method as recited in claim 9 further comprising enabling one or more of the distributed antennas of the distributed antenna system in response to the test information.

16. The apparatus as recited in claim 1 wherein the test results include a time to complete associated with the short message service test.

17. The method as recited in claim 9 wherein the time information includes a time to complete the short message service test.

* * * * *

UNITED STATES PATENT AND TRADEMARK OFFICE
CERTIFICATE OF CORRECTION

PATENT NO. : 8,831,592 B2  
APPLICATION NO. : 14/021241  
DATED : September 9, 2014  
INVENTOR(S) : Shane Michael Elliott et al.

Page 1 of 1

It is certified that error appears in the above-identified patent and that said Letters Patent is hereby corrected as shown below:

On the title page, items (12) and (72), please replace "Elliot" with --Elliott--;

In the Claims

In column 13, line 11, please delete "the";

In column 13, line 12, please insert --the-- after "of".

Signed and Sealed this
Tenth Day of February, 2015

Michelle K. Lee
*Deputy Director of the United States Patent and Trademark Office*